Patented Dec. 15, 1936

2,063,982

UNITED STATES PATENT OFFICE 2,063,982

STABILIZED RUBBER LATEX

Hugh Mills Bunbury, Prestwich, and Robert Bertram Fisher Frank Clarke, Cheadle Hulme, England, assignors to Imperial Chemical Industries Limited, a corporation of Great Britain No Drawing. Application November 18, 1933, Serial No. 698,586. In Great Britain December 5, 1932

2 Claims. (Cl. 18—50)

This invention relates to the production of stabilized rubber latices and in particular to the production of rubber latices so stabilized as to admit of their being mixed with fillers and other compounding ingredients, or treated with acids or acidic substances without coagulation.

Rubber latices, as ordinarily produced, are very unstable and hence cannot be shipped, handled or mixed with other compounding ingredients successfully. Accordingly, various ingredients have been proposed for addition to rubber latices which materials tend to stabilize the latices so that they may be successfully shipped and handled. The various materials heretofore added to rubber latices for this purpose have met with some degree of success. However, they have not proved to be entirely satisfactory for various reasons. For example, many of these materials, such as ammonia, will not permit the addition of other compounding ingredients such as fillers, acids, acidic substances or the like, without coagulation of the latex.

An object of the present invention is to provide rubber latices which have been stabilized so that they may be readily shipped, stored and handled and so that substantially any compounding ingredient may be added thereto without coagulation thereof. A further object is to provide materials for addition to latices for stabilizing the same. A still further object is to provide new methods of stabilizing rubber latices. Other objects are to provide new compositions of matter and to advance the art. Still other objects will appear hereinafter.

These objects may be accomplished in accordance with our invention which comprises the addition to rubber latices, either fresh or artificially concentrated, of sulfonic acids or acid sulfuric esters containing not less than 10 carbon atoms or an alkali or ammonium salt thereof. These compounds may be conveniently represented by the general formula: A—SO₃H, where A represents the radicals R or RX and R represents an aliphatic saturated or unsaturated hydrocarbon radical containing an alkyl chain of not less than 10 carbon atoms. X represents an oxygen atom or an oxygen containing link. The various significances of X may be represented as O, CO₂—R', CONH—R', O—R'. In other words, A, in the formula A—SO₃H, may be considered to represent the radicals R, R—O, R—CO₂—R', R—CONH—R' and R—O—R' wherein R represents an alkyl chain of not less than 10 carbon atoms and R' represents a divalent hydrocarbon radical such as benzylene, propylene, ethylene, butylene, and xylylene. When A represents R the formula is exemplified by cetyl sulfonic acid, cf. Reychler, Bull. Soc. Chim. Belgique, 1913, 27, page 110. Cetylsulphuric ester, is an example of a compound in which A represents RO or X represents O, cf. Beilstein's Handbuch der Organischen Chemie, 4th edition, I, page 430. The oleyl ester of B-hydroxyethanesulphonic acid is described in British Patent No. 366,916. Other compounds coming within our invention are decyl, dodecyl, cetyl, octadecyl, butyl sulphuric ester or B-sulphoethyl oleate, cetyl sulphobenzyl or sulphoethyl ether, sulphuric acid esters of the alcohols from spermaceti, B-sulphoethyl amide of oleic acid and the oleyl ester of isethionic acid. These various compounds may be employed as the alkali salts such as the sodium, potassium and ammonium salts.

The addition of the compounds of our invention may be carried out or without subsequent concentration of the latex by evaporation. Also the stabilizing compound may be added, either alone or with other known stabilizing agents, to the natural latex at or near its source of collection so as to stabilize the latex for transit and storage.

In order to more clearly illustrate our invention, the preferred modes of carrying the same into effect, and the advantageous results to be obtained thereby the following examples are given in which the parts are by weight.

Example 1

4 parts of the sodium salt of the sulphuric ester of the alcohols from spermaceti are dissolved in 100 parts of water and 166 parts of a rubber latex of 60% rubber content are added with stirring. This medium is a stabilized latex. To the stabilized latex, are added 265 parts of china clay, 20 parts of lithopone, 1 part of sulphur and 0.5 parts of zinc diethyldithiocarbamate. These ingredients are mixed in dry by grinding or puddling, water being added as desired. The mixture can be ground in a mill. The mixture is quite stable, being unchanged even after standing for 20 days.

Instead of the sodium salt of the sulphuric esters of the alcohols from spermaceti, that of the sulphuric ester of the alcohol from sperm oil or cetyl sulphuric ester itself, or the sodium salt of B-sulphoethyl oleate, or of sulphobenzyl cetyl ether, may be employed.

*Example 2*

It is known that small quantities of zinc oxide coagulate stabilized latex, and the above example is no exception to this rule. An addition of one or two per cent of zinc oxide will coagulate the mixture described above. However, zinc oxide can be added to the mass in the following manner without causing coagulation.

The latex is stabilized as described above. A large proportion i.e. 50–100 parts of dry zinc oxide per 100 parts of rubber are added to the stabilized latex. There is no coagulation. This mixture can be made into paste with water and the zinc oxide paste so obtained can be added to a compounded latex without causing coagulation. The zinc oxide paste, and the compounded latex containing zinc oxide remain stable for many days.

A compounded latex is also prepared, containing small quantities of zinc oxide, by first pasting with water and stabilizing with sodium cetyl sulphate, using 0.5% of the latter on the zinc oxide. In this way the following mix is prepared:

| | Parts by weight |
|---|---|
| Rubber (as 60% latex) | 100 |
| Zinc oxide | 2 |
| *Vulcafor ZDC | 0.5 |
| Sulphur | 1 |
| Lithopone | 10 |
| China clay | 200 |

*Vulcafor ZDC is a trade name for zinc diethyldithiocarbamate.

Water is added to make a smooth paste. The mix is stable on standing for several days.

*Example 3*

An acidified latex is obtained by mixing the following:

| | Parts |
|---|---|
| Latex (rubber content 60%) | 166 |
| Sodium salt of the sulphuric ester of spermaceti alcohols | 3.75 |
| Aqueous sulphuric acid (15%) | 100 |

The acid is added to the mixture of the other ingredients without causing coagulation.

*Example 4*

A heat concentrated latex is made from the following ingredients:

| | Parts |
|---|---|
| Ammonia preserved latex 30% | 300 |
| Sodium salt of the sulphuric ester of spermaceti alcohols | 3.85 |

The ingredients are mixed and heated to 90° C. with stirring for 3 hours. The mixture is allowed to evaporate. No coagulation takes place. The product has a concentration of 75% solids.

*Example 5*

The following compounded latex is prepared. To 140 parts by weight of "Revertex", containing 70% rubber, there is added 20 parts by weight of a 15% aqueous paste of sodium cetyl sulphate. 35 parts of sulphur flowers, 55 parts of titanium oxide, 5 parts of magnesium oxide, and 60 parts of a 15% paste of Vulcafor Green LS are mixed with sufficient water to give a thin paste. This paste is then added to the stabilized latex and the whole well mixed. 5 parts of zinc oxide and 2 parts of Vulcafor ZDC are made into a paste with water and stabilized with 0.2 parts of a 15% paste of sodium cetyl sulphate. This is then added to the above mix to give the final compounded latex, to which further water is added, if necessary, to give any required consistency. The stable mix so obtained may be converted to a hard rubber of the ebonite type by heating at 114° C. for 16 hours.

Vulcafor Green LS is a trade name for the iron salt of nitroso B-naphthol. "Revertex" is a trade name for concentrated latex.

*Example 6*

A stable latex compound is prepared from the following:

| | Parts |
|---|---|
| Latex (60%) | 160 |
| China clay | 265 |
| Sulphur | 1 |
| Vulcafor ZDC | 0.5 |
| The Na salt of B-sulpho ethylamide of oleic acid | 0.25 |
| Water | 100 |

The ingredients are mixed together and compounded in a paint mill. The product is suitable for spreading purposes.

*Example 7*

The following mix is made up in a similar manner to Example 6 and for the same purpose.

| | Parts |
|---|---|
| Latex (60%) | 160 |
| China clay | 100 |
| Lithopone | 20 |
| Sulphur | 1 |
| Vulcafor ZDC | 0.5 |
| Vulcafor Green LS | 0.5 |
| Oleyl ester of isethionic acid (sodium salt) | 2.0 |
| Water | 100 |

From the above examples, it will be apparent that we may prepare stable fluid or pastry compositions by incorporating fillers, pigments, vulcanizing chemicals or other rubber compounding ingredients into rubber latices, fresh or artificially concentrated, which have been stabilized by a compound of our invention. We thus obtain mixtures devoid of any tendency to coagulate and eminently adapted for spreading or coating. The fillers, pigments, rubber compounding ingredients may, if necessary, even be added in the dry state. Furthermore, acids or acidic substances may be added to the stabilized latices without coagulation and such acidified stabilized latices are a part of our invention.

While we have disclosed some specific members of our class of compounds, to be used as stabilizers, many other compounds falling within such class and the scope of our invention will be readily apparent to those skilled in the art. Furthermore, our compounds may be employed in other types of rubber latices and mixes thereof and the proportions employed may be rather widely varied. However, from about .2% to about 5.0% of the stabilizing compounds, based on the rubber, will usually be found to be sufficient for most purposes.

While we have disclosed the preferred embodiments of our invention, it will be readily apparent to those skilled in the art that many variations and changes may be made therein without departing from the spirit of our invention. Accordingly, the scope of our invention is to be limited solely by the appended claims construed as broadly as is permissible in view of the prior art.

We claim:

1. A process for producing stable rubber latices which comprises mixing with a rubber latex a small proportion of an alkali salt of a compound having the formula $A-SO_3H$ wherein A represents a spermaceti alcohol radical.

2. Rubber latex having incorporated therein, as a stabilizer, a small proportion of an alkali salt of a compound having the formula $A-SO_3H$ wherein A represents a spermaceti alcohol radical.

HUGH MILLS BUNBURY.
ROBERT BERTRAM FISHER.
FRANK CLARKE.